Feb. 25, 1936. H. KÜPPENBENDER 2,032,061
PHOTOGRAPHIC CAMERA
Filed Nov. 17, 1934 2 Sheets-Sheet 1

Inventor.
Heinz Küppenbender
By B. Singer
Attorney.

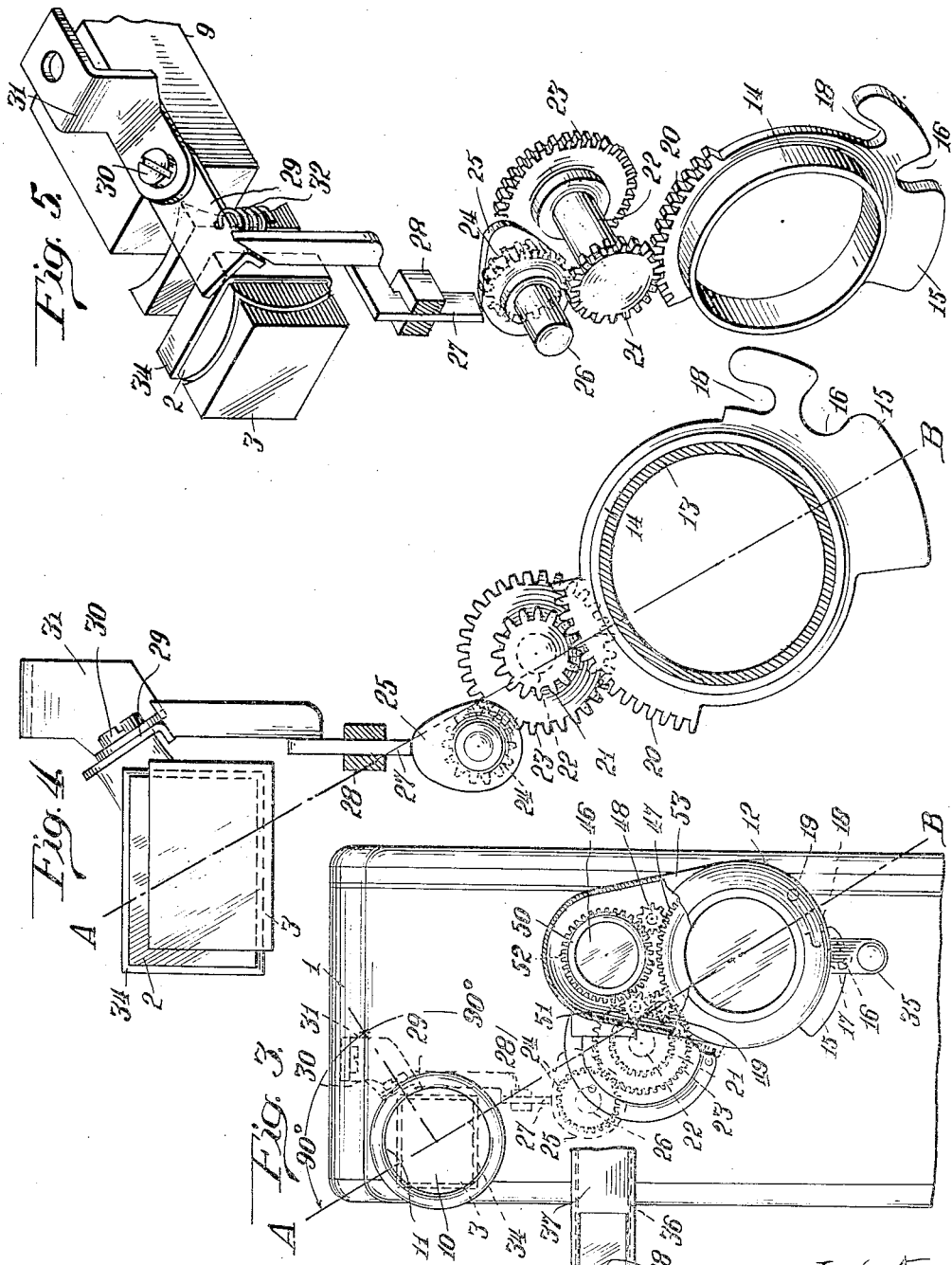

Patented Feb. 25, 1936

2,032,061

UNITED STATES PATENT OFFICE 2,032,061

PHOTOGRAPHIC CAMERA

Heinz Küppenbender, Dresden, Germany

Application November 17, 1934, Serial No. 753,421
In Germany November 23, 1933

14 Claims. (Cl. 95—44)

The invention relates to photographic cameras, including motion picture cameras, and the principal object of my invention is to equip cameras of the type referred to with a novel finder device which is adjusted simultaneously with the lens so that after the lens is focussed upon the object to be photographed the true picture field of the same appears in the finder.

I am aware of the fact, that it has been proposed heretofore to employ for this purpose optical means, for instance rotary wedges, which are arranged in front of the finder for deflecting the light rays of the finder in accordance with the distance for which the lens has been adjusted, so that the axis of the lens intersects the light rays of the finder in the plane of the object to be photographed.

It is now an object of my invention to eliminate the employment of rotary wedges and to use for the same purpose much simpler optical means for the deflection of the light rays of the finder. According to my invention the deflection of the light rays of the finder is accomplished by a single optical wedge of variable thickness and consisting of a combination of a plano-convex lens and a plano-concave lens. These lenses are adapted to be adjusted relatively to each other about the center of their radius of curvature. If both optical axes of these lenses are in alinement with each other the optical deflection is zero, because in this case both lenses together act as a glass plate having two parallel faces, and the light rays of the finder extend parallel to the optical axis of the lens system. If, however, either of the lenses is tilted relatively to the other about its center of curvature, then both lenses together form an optical wedge which deflects the light rays of the finder. The deflection of the light rays is caused only by the two outer plane faces of the lenses when these faces assume an inclined position with respect to each other.

A further object of my invention is to provide a photographic camera or a motion picture camera with a finder device and a distance meter both of which are adjusted simultaneously with the focussing device of the lens system.

Figure 1:
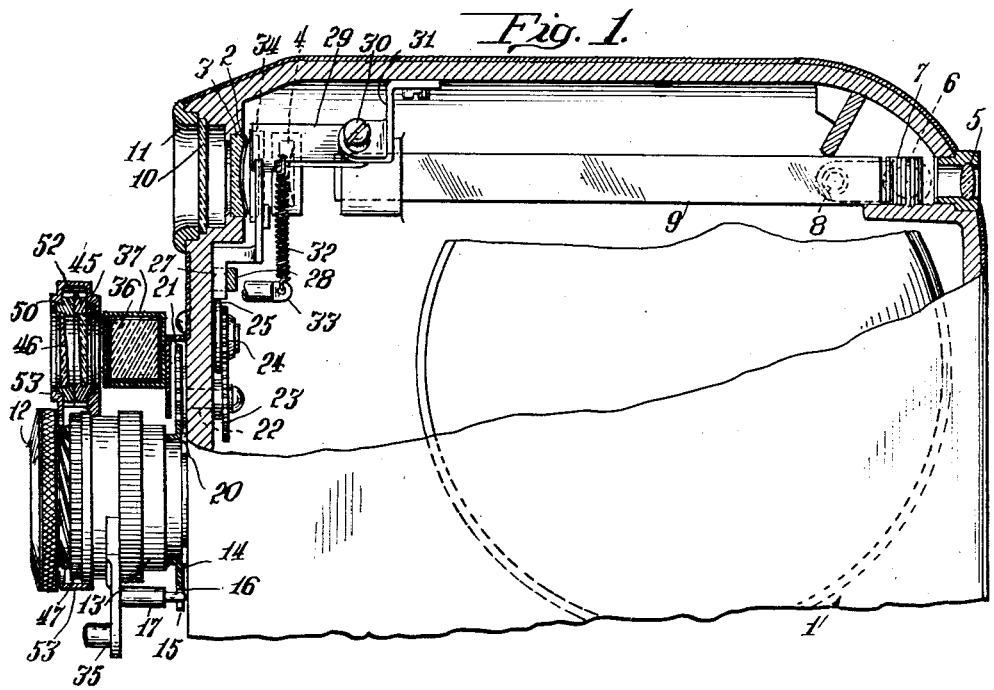
Figure 2:
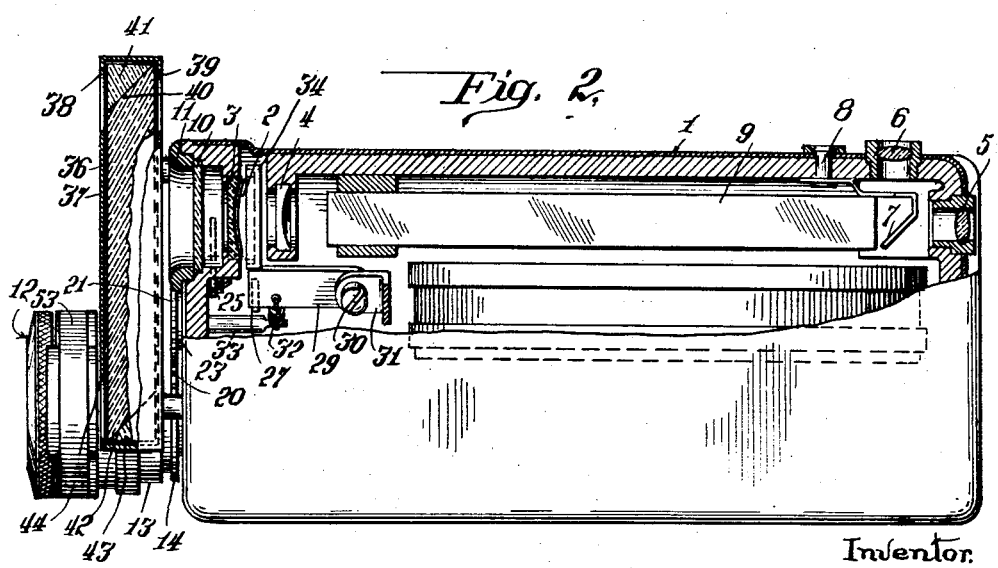

In the attainment of the foregoing objects, together with such further objects as may hereinafter appear or be pointed out, I have provided a construction one embodiment of which is illustrated in the accompanying drawings, wherein:

Figure 1 shows a portion of a motion picture camera in side view, with a portion of the side wall broken away, the distance meter and finder being shown in section, Figure 2 is a top view of the motion picture camera, a portion of the distance meter and the finder being shown in section, Figure 3 is a front view of the upper portion of the motion picture camera with portions of the distance meter and its casing broken away, Figure 4 shows a greatly enlarged front view of the details of the device for adjusting the optical members of the finder relatively to each other, and Figure 5 shows an enlarged perspective view of the various parts of the finder and the gearing for varying the position of one of the optical members.

As shown in the drawings the motion picture camera 1 is provided with a finder which is arranged within the camera casing adjacent the top wall thereof. This finder is equipped with an optical wedge of variable thickness for the purpose of deflecting the light rays of the finder. The optical wedge is composed of a positive plane lens 2 and a negative plane lens 3 and is arranged in front of the finder lens 4. The observation of the finder takes place through an eye lens 5 which is arranged in the rear wall of the camera casing. Another eye lens 6 is arranged in the side wall of the camera casing. A mirror 7 is adapted to be inserted into the path of the light rays of the finder and is moved into the position as shown in Figures 1 and 2 when it is desired to use the eye lens 6 for the observation of the finder. The mirror 7 is secured to a bracket which is mounted on a short rotatable shaft 8 supported in the side wall of the camera casing. A glass bar 9 is inserted between the eye lenses 5 and 6 and the finder lens 4 respectively to shorten the air path. The front wall of the camera casing is provided with an opening 11 which admits the light rays to the finder. In this opening 11 a glass plate 10 is arranged which covers the finder device from the outside.

The lens 2 of the optical wedge is adjustable, and means are provided for adjusting the lens automatically when the lens system 12 of the camera is being focussed. In the described embodiment of the invention the lens system 12 of the motion picture camera 1 is exchangeable and is releasably connected by a bayonet lock with an annular mounting member 13 which is fixedly secured on the front wall of the camera casing. In order to effect an automatic adjustment of the lens 2 when the lens system 12 is adjusted a ring 14 is rotatably mounted upon the annular mounting member 13. The ring 14 has a radially outwardly extending segmental portion 15 provided with a recess 16 in its outer edge. A coupling member 17 on the lens system 12 is adapted to enter this recess 16 when the lens system 12 is inserted into the annular mounting member 13. When the lens system 12 is adjusted, which is accomplished in the present instance by actuation of a lever 35 which moves the lens system in its worm thread, then the ring 14 is likewise adjusted, that is, it is rotated about the annular mounting member 13. One end of the segmental portion 15 is provided with a slot 18 into which a stop pin 19 fixedly related to the camera is adapted to enter to limit the rotative movement of the ring 14.

The ring is also provided with a toothed segment 20 approximately diametrically opposite the segmental portion 15. This toothed segment 20 meshes with a gear 21 secured to a shaft 22 mounted rotatable in the front wall of the camera casing. The shaft 22 preferably extends into the interior of the camera casing and has secured on its inner end a gear 23. This gear 23 meshes with a gear 24 which together with a cam 25 is mounted on a shaft 26 so that gear 24 and cam 25 rotate simultaneously. The circumference of the cam 25 engages the lower end of a vertically movable bar 27 which passes slidably through a guide member 28. The upper offset end of the bar 27 engages a lever 29 which is pivotally mounted at 30 on an angular bracket 31 fixedly secured in the camera casing. A tension spring 32 is connected at one end to the lever 29 and at the other end to an anchor pin 33 is adapted to hold the lever 29 in engagement with the bar 27 and urge said bar into engagement with the cam 25. A lens mounting 34 in which the lens 2 is carried is fixedly attached or integrally connected with the end of lever 29 so that the mounting 34 and lens 2 are adjusted in an arc when the lever 29 is pivoted about its pivot at 30. The pivotal connection of the lever 29 is arranged in such way that the lens 2 is adjusted about the center of curvature of the lenses 2, 3 in the direction of a line A—B which intersects the axes of the lens system 12 and of the finder device (Figs. 3 and 4).

The finder device of the present invention according to the above description is operatively coupled with the adjusting device of the lens system, and contains a single variable optical wedge composed of a plano-convex and a plano-concave lens, one of which is adjustably mounted and is adjusted simultaneously with the lens system to deflect the light rays for the finder in such manner that the operator always observes in the finder same picture field which is covered by the lens system.

The cam 25 has a predetermined shape to differentially vary the thickness of the optical wedge formed by the relatively adjustable lenses 2 and 3, so that regardless of the distance of the object to be photographed from the camera, the finder is always automatically adjusted simultaneously with the lens system to show the operator the true picture field covered by the lens system.

For focusing the lens system the camera of the present invention, which by way of example is shown as a motion picture camera, is equipped with a base distance meter of the type described in my copending patent application Serial No. 744,623 filed September 19, 1934. This distance meter is operatively coupled with the adjusting device of the lens system. In the present instance the distance meter includes a rhombic prism 36 forming the mirror base. This prism 36 is arranged in a casing 37 mounted on the front wall of the camera casing. The casing 37 has on its outer end two registering openings 38 and 39 one of which faces the object to be photographed while the other one is an observation opening for the operator to watch the picture appearing on the reflecting face 40 of the prism 36. This reflecting face 40 is provided with a semi-transparent silvered or gilded coating upon which a prism 41 is cemented. The other reflecting face 42 of the prism 36 is fully silvered and for protection has cemented thereon a prism 43. The reflecting face 42 is arranged behind an opening 44 in the front wall of the casing 37 near its inner end. The deflection of the measuring rays is effected by two oppositively movable rotary wedges 45 and 46 which are adapted to be rotated relatively to each other by a gear 47 on the lens system 12. The gear 47 meshes with intermediate pinions 48 and 49, the former of which engages a toothed annular rim 50 in which the wedge 46 is mounted. The other pinion 49 meshes with another pinion 51 which in turn engages a toothed annular rim 52 in which the other wedge 45 is mounted. Both wedges 45 and 46 and their mounting rims are enclosed in a housing 53 which is fixedly secured on the circumference of the barrel of the lens system 12. The lens system 12 is focused correctly when both images presented on the reflecting face 40 and observed through the opening 39 are brought into accurate register.

Having thus described my invention, I claim as new and desire to secure by Letters Patent:

1. In a photographic camera, the combination of a lens system, means for adjusting the same, a finder, optical members forming a single wedge in front of said finder, means for adjusting said wedge forming members angularly to each other, and means operatively connecting said wedge adjusting means with said lens system adjusting means.

2. In a photographic camera, the combination of a lens system, means for adjusting the same, a finder, a single wedge of variable thickness in front of said finder for deflecting the light rays of the same, means for varying the thickness of said wedge to change the angle of its exterior plane faces and means operatively connecting said wedge varying means, with said lens system adjusting means.

3. In a photographic camera, the combination of a lens system, means for adjusting the same, a finder, a variable wedge composed of a positive lens and a negative lens in front of said finder, and means actuated by said lens system adjusting means for varying the position of one of said lenses relatively to the other whereby the angle formed by the exterior plane faces of the wedge is changed.

4. In a photographic camera, the combination of a lens system, means for adjusting the same, a finder extending with its optical axis parallel to the axis of said lens system, a variable wedge composed of a positive lens and a negative lens in front of said finder, and means actuated by said lens system adjusting means for varying the position of one of said lenses relatively to the other, said variable lens being pivotally adjustable about its center of curvature and in a plane containing the axes of the finder and the lens system.

5. In a photographic camera, the combination of a lens system, means for adjusting the same, a finder, a wedge of variable thickness in front of said finder adapted to deflect light rays, means for varying the thickness of said wedge to change the angle of its exterior plane faces and means operatively connecting said wedge varying means with said lens system adjusting wedge varying means, said means including a control element adapted to differentially vary the thickness of said variable wedge.

6. In a photographic camera, the combination of a lens system, means for adjusting the same, a finder, a variable wedge composed of a positive lens and a negative lens in front of said finder, and means actuated by said lens system adjusting means for varying the position of one of said lenses relatively to the other whereby the angle between the exterior faces of said wedge is changed, said means including a cam for controlling the change of position of the variable lens.

7. In a photographic camera, the combination of a lens system, means for adjusting the same, a finder, wedge forming lenses in front of said finder, means for varying the angle of deflection of said wedge forming lenses, an optical distance meter, and means for actuating the same, the means for varying the angle of deflection and the means for actuating the distance meter being operatively connected with said lens system adjusting means and being operable by and simultaneously with the latter.

8. In a photographic camera, the combination of a lens system means for adjusting the same, a finder extending with its optical axis parallel to the axis of said lens system, a variable wedge composed of a positive lens and a negative lens in front of said finder adapted to deflect light rays, a bracket, a lever pivotally connected to the bracket and adapted to swing in a plane which is parallel to a plane passing through the optical axis of said finder and the optical axis of said lens system, the axis of pivotal movement containing the center of curvature of said lenses, a lens mounting for one of said wedge forming lenses fixedly secured to said lever and means for actuating said lever, said last named means being controlled by said lens system adjusting means.

9. In a photographic camera, the combination of a lens system, means for adjusting the same, a finder extending with its optical axis parallel to the axis of said lens system, a variable wedge composed of a positive lens and a negative lens in front of said finder adapted to deflect light rays, a bracket, a lever pivotally connected to the bracket and adapted to swing in a plane which is parallel to a plane passing through the optical axis of said finder and the optical axis of said lens system, the axis of pivotal movement of said lever containing the center of curvature of said lenses, a lens mounting for one of said wedge forming lenses fixedly secured to said lever, a ring provided with gear teeth rotatable about the axis of said lens system and adapted to be rotated by the adjusting means of the same, a gearing driven by said ring, and a cam rotated by said gearing and adapted to actuate said lever which carries one of said wedge forming lenses.

10. In a photographic camera, the combination of a lens system, a distance meter, a finder device which includes relatively adjustable members forming an optical wedge for deflecting into the finder an image of the object to be photographed in the exact position as it is recorded by the lens system on the light sensitive layer, and means for simultaneously adjusting said lens system, said distance meter and one of said members.

11. In a photographic camera, the combination of a lens system, a finder device which includes a finder lens in front of which is arranged a plane-convex lens and a plane-concave lens forming an optical wedge, said wedge forming lenses being relatively adjustable to each other about their center of curvature, and means for simultaneously adjusting said lens system and one of said wedge forming lenses.

12. In a photographic camera, the combination of a lens system, means for adjusting the same, a finder, optical members forming a single wedge in front of said finder, means for relatively adjusting said wedge forming members so that the object upon which the lens system is focussed appears in exactly the same position in the finder as it is recorded by the lens system on the light sensitive layer, and means operatively connecting said wedge adjusting means with said lens system adjusting means.

13. In a photographic camera, the combination of a lens system, means for adjusting the same, a finder, a single wedge of variable thickness in front of said finder, means for varying the thickness of said wedge in such manner that the object upon which the lens system is focussed appears in exactly the same position in the finder as it is recorded by the lens system on the light sensitive layer, and means operatively connecting said wedge varying means with said lens system adjusting means.

14. In a photographic camera, the combination of a lens system, means for adjusting the same, a finder including a finder lens and a plurality of relatively adjustable members forming an optical wedge in front of said finder lens, means for adjusting one of said members to vary the angle between the plane exterior faces of said wedge, and means for simultaneously operating said lens system adjusting means and said member adjusting means.

HEINZ KÜPPENBENDER.